United States Patent [19]

LeCompte et al.

[11] Patent Number: 5,128,433
[45] Date of Patent: Jul. 7, 1992

[54] THIXOTROPIC POLYMER COMPOSITIONS AND PROCESS FOR USE THEREOF

[75] Inventors: Robert A. LeCompte, Lebanon; Scott S. Moninghoff, Milford, both of N.J.

[73] Assignee: Polytek Development Corp., Lebanon, N.J.

[21] Appl. No.: 710,068

[22] Filed: Jun. 4, 1991

[51] Int. Cl.$^5$ ............................................ C08G 18/10
[52] U.S. Cl. ........................................ 528/60; 528/64; 528/73; 528/75; 528/76; 528/77; 427/385.5
[58] Field of Search .............. 528/60, 64, 73, 75, 528/76, 77; 427/385.5

[56] References Cited

U.S. PATENT DOCUMENTS

| | | | |
|---|---|---|---|
| 3,547,858 | 12/1970 | Marsh et al. | 260/22 |
| 3,909,465 | 9/1975 | Wiedermann et al. | 260/2.5 |
| 4,072,673 | 2/1978 | Lammers | 264/225 |
| 4,131,667 | 12/1978 | Lovell et al. | 264/571 |
| 4,218,543 | 8/1980 | Weber et al. | 521/51 |
| 4,366,108 | 12/1982 | Urech et al. | 264/137 |
| 4,374,210 | 2/1983 | Ewen et al. | 521/159 |
| 4,383,068 | 5/1983 | Brandt | 524/196 |
| 4,396,729 | 8/1983 | Dominquez et al. | 521/51 |
| 4,433,067 | 2/1984 | Rice et al. | 521/51 |
| 4,447,586 | 5/1984 | Shimp | 525/504 |
| 4,456,541 | 6/1984 | Wright | 252/50 |
| 4,463,126 | 7/1984 | Gruber et al. | 524/589 |
| 4,463,141 | 7/1984 | Robinson | 525/467 |
| 4,466,936 | 8/1984 | Schapel | 264/225 |
| 4,487,913 | 12/1984 | Chung | 528/83 |
| 4,487,948 | 12/1984 | Shimp et al. | 549/552 |
| 4,507,459 | 3/1985 | Schmidt et al. | 528/64 |
| 4,515,933 | 5/1985 | Chang | 528/76 |
| 4,528,305 | 7/1985 | Henry | 523/219 |
| 4,719,278 | 1/1988 | Wellner et al. | 528/64 |

OTHER PUBLICATIONS

Nalepa et al., A New Cure for Cast Elastomers, reprinted from Polyurethanes World Congress 1987.

Nalepa, C. J., Ethacure ® Polymer Modifiers: Versatile Curatives for the Polyurethane Cast Elastomer Industry, presented at the Canadian Urethane Manufacturers Association Meeting, Montreal, Canada, May 12, 1989.

Primary Examiner—Maurice J. Welsh
Attorney, Agent, or Firm—Leroy G. Sinn

[57] ABSTRACT

Provided by this invention are thixotropic polymer compositions, which are useful upon curing to make tough coatings, sealants, adhesive bonds and molds. The compositions can be supplied to the site of use as two low viscosity liquid parts, which when mixed provide rapid onset of thixotropy. One or more polyisocyanates and one or more aromatic diamines are used in making the compositions. Processes for making coatings, sealants, adhesive bonds and molds by use of the compositions are also provided.

20 Claims, No Drawings

THIXOTROPIC POLYMER COMPOSITIONS AND PROCESS FOR USE THEREOF

FIELD OF INVENTION

This invention relates to polymer compositions which are thixotropic. The compositions are suitable for applying a non-sag coating to a surface, such as a vertical surface and which will result upon curing in a tough polymeric coating.

BACKGROUND OF THE INVENTION

There is a need for improved polymer compositions which are suitable for applying to the surface of various objects, either as a coating which will adhere to the surface, a sealant, adhesive or a coating which can be removed to provide a mold that has the shape and the contours of the surface to which the composition was applied. Commercially speaking, polymer compositions used for these purposes have often been two-part liquid compositions which cure to elastomers or plastics at room temperature. They must be non-sag if they are to be applied to a vertical, overhead or even a horizontal surface without excessive runoff. Such compositions have been generally made by a manufacturer at one location and sold in pails or cans to the user who then mixes the two components at another location.

The individual parts of prior art non-sag two-part compositions have been made non-sag prior to mixing by the user so the user mixes pastes or prethickened liquids. Otherwise, the user mixes the two-part liquid compositions and then must add a third part to thicken the mixture to a suitable non-sag state.

Mixing such pastes or prethickened liquids is difficult and can result in poorly mixed compositions. Also, adding a third component is difficult as well. Compositions which are made non-sag by the manufacturer require extra ingredients which often add nothing to the performance of the compositions to achieve the thickening. Additionally, package stability of such compositions is sometimes a problem.

It is desired in such polymer compositions that coatings formed therefrom are tough with high tear and tensile strengths.

It would be desirable to provide a method of chemical thickening which takes place right after two newtonian liquid parts are mixed which provides the proper degree of non-sag character to the composition and aids curing to a tough polymer at room temperature.

Such two-part compositions would be useful for use as brush-on mold compositions which cure to a flexible rubber mold for casting objects from gypsum plasters, waxes, portland cements and various thermosetting resins such as epoxy resins, polyesters, polyurethane and others. They would be also useful to fill a gap between two surfaces and as coatings which require some non-sag character to achieve proper film build when applied.

Two-part compositions are often preferred for such uses over one-part compositions because they generally contain minimum volatile content, which take time to dry and cause subsequent shrinkage and they may be applied and cured rapidly at room temperature without the use of heat.

SUMMARY OF INVENTION

The compositions of this invention are compositions which are provided to the job site in two or more parts. The compositions provided are thixotropic polymer compositions upon the homogeneous admixture of the components thereof and result upon curing of the thixotropic polymer compositions in a tough polymeric coating, sealant, adhesive bond or mold or other final form of the polymeric composition. The thixotropic polymer compositions are formed by homogeneously admixing the Ingredients of said composition which Ingredients comprise:

I—an aromatic polyisocyanate or combinations thereof, suitably a low molecular weight polyisocyanate based on 4,4'-diisocyanatodiphenylmethane, 4,4 diisocyanatodiphenylmethane, toluene diisocyanate or the like; a portion of the aromatic polyisocyanate can be prereacted to form prepolymer by reaction with Ingredient II defined hereafter, provided that a sufficient amount of the aromatic polyisocyanate remains for reaction to provide the desired thixotropic and other properties in the composition;

II—one or a combination of a long chain members selected from the group consisting of polyols, polyamines, polymercaptans and epoxy resins;

III—active aromatic diamines wherein the amine groups are primary; and

IV—optionally catalyst as needed or desired for reaction of the Ingredients to provide desired curing;

said Ingredients II and III being present in an amount sufficient to react with substantially all of the isocyanate groups of Ingredient I;

Ingredient I will be maintained prior to actual preparation of said composition for use in a separate part from Ingredients III and IV;

said composition thickening to provide a non-sag rheology whereby said composition when applied to a surface adheres thereto in an essentially non-sag manner; and said composition curing at room temperature to form the desired tough composition.

The composition will have a fluid thixotropic working life time of at least about five minutes, preferably at least about 10 to about 60 minutes.

Suitably, the cure time will be at least about one hour to about 24 hours, depending upon the use and the particular surface to which the polymer composition is applied. Ordinarily, the curing will occur overnight.

The composition desirably is divided into two low viscosity liquid parts:

Part A being a low viscosity liquid comprising Ingredient I (low molecular weight aromatic polyisocyanate component). Part A will have sufficient unreacted isocyanate groups to react with Ingredient III and to contribute as required to the curing of the composition after applied for its intended use. Part A must have sufficient low molecular weight polyisocyanate (Ingredient I) when mixed with Ingredient III to cause the thickening required in the composition; and Part B is a low viscosity liquid comprising Ingredient III (the active aromatic diamine).

Long chain Ingredient II of said composition is present in either Part A or Part B or desirably divided between Parts A and B;

Optional catalyst Ingredient IV is present in Part B.

Ingredient II can be any functional combination as defined, although preferably there is used a long-chain polypropylene glycol. Polypropylene glycol used can be linear having primary or secondary hydroxy groups or can have branching providing one or more additional hydroxy groups. All or a part of the long-chain polyglycol can be replaced with another reactive long chain polymer, such as with suitable polyamine or polymercaptan. When a polyamine is used as Ingredient II, polyureas are formed and when polymercaptan is used as Ingredient II, thiourethanes are formed.

The aromatic diamines have amine groups which are primary and react with the low molecular weight polyisocyanate (Ingredient I) to impart a rapid thickening or thixotropic character to the composition. This reaction usually proceeds immediately without need of catalyst.

The catalyst if used promotes curing of the long chain ingredients after thixotropy has developed and can be selected in nature and in quantity to provide a curing time of at least about one to about 24 hours and a liquid thixotropic working time as needed, usually about 5 to 60 minutes, as the case requires to permit the composition comprising two parts or more to be thoroughly mixed and to be applied to the surface prior to the time the composition becomes excessively thick to be workable.

Provided also by this invention is a process for coating a surface wherein a composition as above defined having two or more parts is made in its final form to be applied at the location at which the coating is to be applied. The respective parts of the composition are admixed and homogeneously mixed and applied to the surface. The application can be made by customary means and will be applied to the thickness which is desired.

Also provided by this process is a method of providing a polymeric mold wherein the steps are carried out as described above for coating. The surface to which the coating is applied can be specially coated on a preliminary basis so that the coating can be removed upon curing as a mold having the shape, configurations and contours of the surface.

Finally, provided by this invention is a method for sealing or adhesive bonding by which the procedures for making the composition as above defined for providing the coating are followed and the crevice or recess to be sealed or surfaces to be sealed or adhesively bonded are treated with an application of the composition wherein the respective Ingredients have been thoroughly admixed in a homogeneous manner.

DETAILED DESCRIPTION OF THE INVENTION AND THE PREFERRED EMBODIMENTS

A preferred composition of this invention can be made by utilizing a long chain polypropylene glycol having preferably two secondary hydroxy groups. The polypropylene glycol used will have a suitable molecular weight. It has been found that a suitable polyhydroxy material will have a molecular weight in the range of from about 60 up to about 20,000 and desirably from about 90 to about 7,000. Ethylene glycol can be used (molecular weight—60) and 1,4-butanediol can be used (molecular weight—90). Higher molecular weight polyhydroxy materials can be used if available provided they function to provide the required properties in the compositions. A combination of linear and branched polyglycols can be used or a polyglycol with a combination of primary and secondary hydroxy groups can be used. Suitable polypropylene glycols are available commercially.

It is at times desirable to prepare a prepolymer by prereacting Ingredients I and II to an extent as desired. This can be accomplished conventionally in illustration by heating an amount of polypropylene glycol and a molar equivalent excess of low molecular weight aromatic polyisocyanate to a suitable elevated temperature, for example, to about 190°-200° F. for about 4-5 hours, or this reaction can proceed until, for example, an isocyanate group has reacted with each hydroxy group of the polyglycol.

The compositions provided by this invention and utilized in the processes of this invention provide surprisingly important advantages. It is very advantageous that the compositions, when applied to surfaces for various reasons cited above, can be made by mixing the parts and be applied in a quick and efficient manner. Also important is the advantage of being able to apply to a surface without the often encountered sag problem. Additionally it is possible to obtain a consistency sufficiently thick to adhere to the surfaces without adding thickening agents either by the manufacturer or by the user at the site of use of the compositions. Heretofore certain additives, such as a pyrogenic silica available commercially under the designation CAB-O-SIL, have been added to the polymeric liquid in order to obtain adequate thickening. It is possible by use of the compositions of this invention to provide them in two parts, Parts A and B, or if desired, in three or more parts and transport the Parts to the site at which the coating will be applied. Parts A and B are two low viscosity liquids. Part A contains low molecular weight aromatic polyisocyanate. Part A also desirably contains a portion of the polyglycol or polymercaptan or epoxy resin or combinations thereof (Ingredient II), either alone or as a prepolymer reaction product with an amount of the polyisocyanate ingredient. When Ingredient II is polyamine, ordinarily the polyamine is not used to form prepolymer since such prepolymers in general do not exhibit sufficient storage stability.

Part B, constituting another low viscosity liquid, contains the aromatic diamine (Ingredient III), and optionally a portion of Ingredient II. Part B also contains any catalyst in sufficient quantity to bring about desired curing. If one or more Ingredients are for some reason supplied to the site separate from Parts A and B, definitions of Parts A and B are considered herein to be inclusive thereof.

Additionally, the following compositions are within the scope of the compositions of this invention wherein unsaturated polyesters and polysulfides can be used to replace partially or totally Ingredient II as defined above, so long as Parts A and B are low viscosity, miscible liquids which provide rapid onset of thixotropy when mixed and the mixture thereof cures to provide the required toughness and other desired properties. Illustrative of such compositions are the following:

First Composition

Part A—a peroxide (e.g., MEK peroxide) suitable for curing unsaturated polyester polymers and low molecular weight polyisocyanate (e.g., MDI).

Part B—active aromatic diamine and unsaturated polyester.

Second Composition

Part A—A suitable curing agent for polysulfides such as lead peroxide, calcium peroxide, magnesium dioxide or the like and low molecular weight polyisocyanate (e.g., MDI).

Part B—active aromatic diamine and polysulfides.

Catalyst for curing (Ingredient IV), if used, should normally not be included in Part A, especially if inclusion causes substantial storage instability of the polyisocyanate (Ingredient I). Peroxides and dioxides referred to above are not catalysts within the definition of Ingredient IV.

The reaction between the Ingredients of Parts A and B is carried out at the site of the desired application of the composition Reaction between any of the Ingredients is not required prior to the time of actual use.

The polyisocyanates used as Ingredient I can be 4,4,'-diisocyanatodiphenylmethane, polyisocyanates based on 4,4,'-diisocyanatodiphenylmethane or combinations thereof. This would include the polyphenylpolymethylene polyisocyanates which may be obtained by aniline-formaldehyde condensation followed by phosgenation. Other suitable polyisocyanates which can be included in providing the compositions of the invention can be selected from toluene diisocyanate and the like polyisocyanates. It is preferred that the polyisocyanate be in liquid form at room temperature.

Aliphatic polyisocyanates can be selected for substitution for the low molecular weight polyisocyanates as Ingredient I, from a few percent to a total substitution. To the extent that the desired reactions and properties are retained, such compositions resulting from such substitution come within the intent and scope of this invention.

The polyols which can be used in the preparation of the compositions of this invention are preferably polyhydroxy materials having molecular weights of from about 60 to about 20,000, and most preferably from about 90 to about 7,000. Polyether and polyester polyols are suitable for use in the present invention. Preferred are those having at least 2, and preferably 2 or 3 hydroxyl groups. Such polyols are known and may be prepared by known methods. Glycerol can be included in the reaction mixture as an initiator to provide trihydroxy polyols such as trihydroxy polypropylene glycols. Polyethers modified with vinyl polymers are also suitable. These may be obtained, for example, by the polymerization of styrene and acrylonitrile in the presence of polyethers. Polybutadienes having —OH groups may also be used as a polyol.

The polyol can be substituted in part or in total by the use of certain polymercaptans or polythioethers. Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio-mixed ethers, polythio-ether esters or polythio-ether ester amides, depending on the cocomponents.

Also the polyols can be substituted in part or in total by appropriate polyamines. Such polyamines will have molecular weights similar to the ones defined in the ranges set forth above with respect to the polypropylene glycol. A suitable polyamine is sold by Air Products Corporation under the designation Polamine, such as Polamine 1000.

Other high molecular weight polymers can be used in part or whole as Ingredient II so long as they have the necessary functional groups and do not interfere with the essential thixotropy and curing.

The active aromatic diamine (Ingredient III) which is used in the present invention may be selected from the group consisting of active aromatic diamines, which contain at least one alkyl substituent in the ortho-position to a second amine group or mixtures thereof, preferably with the proviso that at least two of said alkyl substituents contain at least two carbon atoms. By "active" diamines and polyamines are meant those whose reactivity towards isocyanates has not been reduced to a level at which they react too slowly to be effective in causing desired thixotropy in the compositions by electron attracting substituents, such as halogen, ester, ether or disulphide groups, as is the case, for example, with methylene-bis-chloroaniline (MOCA). The aromatic diamine is generally used in the process according to the present invention in quantities of from 1 to 50% by weight, preferably from 5 to 35% by weight, based on Ingredient II.

Alkylated aromatic amines are known, see for example, U.S. Pat. Nos. 3,862,233; 2,814,646; 3,649,693; 3,678,112; and U.S. Pat. No. 3,678,113. As is suggested by these patents, the alkyl substituent can have as many as twenty carbon atoms. Likewise in the instant invention, the alkyl substituents may be straight or branched long chains.

Liquid or dissolved aromatic amines which have proved to be particularly suitable for the process according to the present invention are those which contain at least one alkyl substituent in the ortho-position to a first amine group and two alkyl substituents having from 1 to 3 carbon atoms in the ortho-position to a second amino group, provided that two of these alkyl substituents contain two or three carbon atoms. Examples include: 1-methyl-3,5-diethyl-2,4-diaminobenzene, 1-methyl-3,5-diethyl-2,6-diaminobenzene, 1,3,5-triethyl-2,6-diaminobenzene, 3,5,3-tetramethyl-4,4,-diaminodiphenylmethane and the like.

The above mentioned active aromatic amines may, of course, be used as mixtures with each other or in combination with other active aromatic amines, provided a majority of the amine is of the type described.

Suitable aromatic diamines can be selected from the following available commercially under these designations:

MDA, 4,4,-methylene dianiline
Epotuf 95-447 (sold by Reichold Chemical Corp.)
meta-phenylenediamine
TONOX (crude MDA), sold by Uniroyal Corp.
Ethacure 300, di(methylthio)toluenediamine, sold by Ethyl Corp.
Epotuf 1399-01, sold by Reichold Chemical Corp.
Ethacure 100, diethyltoluenediamine, sold by Ethyl Corp.
Araldite XU 205 and Araldite XU 265, sold by CibaGeigy Corp.

In cases in which the diamine Ingredient III used is crystalline at mixing temperature, it is dissolved in the polyol or other suitable liquid component.

Catalysts (Ingredient IV) are used as desired or required in carrying out the invention disclosed herein and are known for use in curing reactions involving isocyanate reaction products such as formed in making the compositions of this invention. The use of these catalysts, one or more, is at times essential to obtain the correct reaction rate to obtain suitable curing of the polymeric compositions of this invention when they are put in place as a coating, a sealant, adhesive bond or put in place to form a mold. The catalyst can be certain organic metallic compounds, such as are known for use in carrying out polyurethane polymerizations. It has been found suitable to use certain organic mercury catalytic compositions such as aryl mercurial compositions, such as sold by CasChem under the trademark Cocure, for example, Cocure 32.

It is often desired to include a certain amount of plasticizing agent in order to provide the consistency of the compositions desired for a particular end use, such as fluidity and flow, and for other purposes. Common plasticizing agents can be utilized, such as diisononyl phthalate, butyl-benzyl phthalate, adipates, and the like.

Certain other liquids and solvents can be added to the compositions so long as their presence does not interfere with the required thixotropy, curing and reaction, and at times such liquids and solvents may be desired to provide a lowering of viscosity and for other purposes. Such liquids and solvents in illustration can be selected from esters such as ethyl acetate, toluene, ketones, low-viscosity petroleum distillates, and the like.

At times it is useful to include an amount of an appropriate and compatible anti-foaming agent. A small amount of an anti-foaming agent of a conventional type can be utilized for the purpose of removing entrapped air bubbles caused by mixing. Ordinarily a small amount is sufficient. Suitable anti-foaming agents can be selected from such products sold by Dow Corning, Monsanto, Union Carbide and others.

The compositions of this invention can be prepared in illustration as follows (using the exact quantities defined in Example 1): About 30 parts by weight of polypropylene glycol (PPG-3025), about 5 parts of polypropylene glycol (Poly G-30-42), and about 4 parts of TDI are added to the vessel and mixed. This mixture is heated for 4-5 hours at 90° F. This provides a prepolymer of TDI and polypropylene glycol. The mixture is permitted to cool to about ambient room temperature. About 8 parts of polymeric MDI, together with about 2 parts of a suitable plasticizing agents are added to the mixture and the mixture is thoroughly mixed to provide Part A using a suitable vacuum equipped heated vessel equipped with stirring. Part B can be prepared utilizing about 18 parts of the polypropylene glycol (PPG 3025), about 18 parts of the polypropylene glycol (Poly G-30-42), together with 7 parts of the plasticizing agent, and about 5.5 parts of aromatic diamine, such as diethyltoluenediamine (DETDA), and a suitable amount of catalyst to bring about the desired curing. To this can be added a small amount of a suitable anti-foaming agent. Part B is prepared also using a suitable vessel equipped with stirring. Parts A and B are placed in suitable separate containers. Other compatible agents can be added as desired, such as fillers, pigments, colors and the like.

At the job site, equal weights of Part A and Part B can be added together with good mixing. It will be noted that the reaction will commence immediately upon mixing so that the composition becomes thixotropic. When the consistency reaches a suitable thickened state, it can be applied to the surface using conventional means.

The surface is adequately cleaned before application of the composition following standard procedures. The composition is applied at a desired thickness and finished or processed as desired to give the desired appearance. The applied composition will be allowed to cure. Curing can be accelerated if desired by heat, light, moisture or certain chemical vapors. Models for such molds are often of sculpture such as human, animal or abstract forms but may also be architectural shapes, industrial shapes, prototypes and many other three dimensional objects.

The amount of catalyst if desired or required and the nature of the catalyst can be varied depending on the desired rate of curing and desired properties of the final cured polymer. The amount of the diisocyanate component will be selected to provide a substantially equimolar amount of isocyanate groups to the amine, hydroxy and other reactive groups so as to substantially consume in the reaction the isocyanate groups.

Parts A and B should have sufficiently low viscosity to permit easy mixing at the site prior to application. Viscosity below 10,000 centipoise (mPa·s) as measured by a Brookfield Model HBT Viscometer at 5 rpm at mixing temperature is preferred. Generally, the lower the viscosity the easier it will be to mix the Parts to the desired homogeneous state.

Once the mixture of the Parts becomes thixotropic the viscosity must be low enough that the material can be brushed or trowelled or otherwise applied to the surface. If too much isocyanate and diamine are used in proportion to other materials it is possible to thicken a mix to the point that it is an unworkable clay-like solid.

For trowel application viscosity below 5,000,000 centipoise (mPa·s) is generally preferred. For brush application viscosity below 20,000 centipoise (mPa·s) is preferred. Since thixotropic materials display lower viscosity as the shear rate increases the above viscosity measurements are all made at 5 rpm. If the measurements were made at a slower rpm the viscosity would be higher and if at a faster rpm the viscosity lower.

Toughness of the compositions can be indicated by obtaining tear strength values using ASTM Test D-624 Die C. Test specimens of the compositions are permitted to cure at room temperature for 7 days before testing. Tear strength values of at least 10 pli are desired, and values of at least 20 pli are preferred. Tear strength values of about 40 pli or more are common for many compositions and values can be higher, such as 200 pli to 400 pli or higher. Other tests can be used at times for indication of toughness, for example, D-790-80 Standard Test Method For Flexural Properties of Plastics And Electrical Insulation Materials and ERF 23-69 Method of Testing For Falling Ball Impact Resistance of Cured Epoxy Compounds. Tensile strength values for cured compositions are determined by following ASTM Test D-412. Suitably tensile strength will be at least 35 psi and preferably at least 50 psi. The hardness of the cured compositions can be measured using Shore Durometers as in ASTM D-2240, the hardness value commonly in the range of Shore A 10 to Shore D 90.

Various modifications of the compositions and processes of this invention will become apparent to those skilled in the art and to the extent that they conform to the spirit of this invention are intended to be included therein. The following examples are illustrative of the invention and are not meant to be limiting.

EXAMPLE 1

The following PARTS are mixed on a equal weight basis to provide a homogeneous mixture:

|  | Parts by weight |
|---|---|
| PART A |  |
| Polypropylene glycol (PPG-3025) (difunctional) | 30.0327 |
| Polypropylene glycol (Poly G-30-42) (trifunctional) | 5.3349 |
| Plasticizer | 2.1147 |
| Toluene diisocyanate | 4.3927 |

-continued

|  | Parts by weight |
| --- | --- |
| Polymeric MDI (PAPI 2094) | 8.125 |
| PART B |  |
| Polypropylene glycol (PPG 3025) | 18.45 |
| Polypropylene glycol (Poly G-30-42) | 18.45 |
| Plasticizer | 7.3605 |
| Diethyltoluenediamine (DETDA) | 5.55 |
| Aryl Mercurial (Cocure 32) | 0.185 |
| Antifoam | 0.0045 |

Upon admixing Parts A and B, the mixture rapidly turns to a thixotropic mixture and remains workable for about 20 minutes. The composition then can be applied to a surface such as a vertical or overhead surface with a brush or spatula to provide a coating, sealant, molding or adhesive bond. The quantity applied depends upon the thickness desired.

By increasing the ratio of the difunctional polypropylene glycol to trifunctional polypropylene glycol, a cured coating is obtained having higher elongation value and reduced tensile strength value. By decreasing the ratio, a cured coating is obtained having a lower elongation value and an increased tensile strength value.

In using the mixture to provide a mold, the mixture in thixotropic form is applied to the surface of which the mold is desired. The surface is ordinarily treated so that the formed mold will release from the surface and will not damage the surface. It has been found that treating the surface with a suitable mold release agent is ordinarily advisable, for example, with a release agent sold by Polytek Development Corp. as Pol-Ease. Ordinarily, the mold thickness is built up in two or three coats or more. It is found that the coating in building up a desired thickness can be applied in about one hour intervals.

The coating or mold is permitted to cure overnight at room temperature. The cured coating of the mixture or the mold of the mixture constituents a tough polymer part. The resulting mold can be removed and used for the intended molding. Reinforcing agents can be incorporated into the coating or mold if desired, such as glass fibers or cloth or other appropriate ones.

EXAMPLE 2

Compositions following the general procedure described in Example 1 are made using the components shown in the following table (compositions 2, 3, 4 and 5), the amounts being in percent by weight based on the weight of the total composition.

TABLE

| Component | 2 | 3 | 4 | 5 |
| --- | --- | --- | --- | --- |
| Polymeric MDI | 23.56 | 43.14 | 12.82 |  |
| Diethyltoluenediamine (DETDA) | 3.62 | 2.70 | 4.13 | 5.61 |
| Long chain polyamine (Polamine 1000) | 72.49 |  |  |  |
| Polypropylene glycol (PPG 425) |  | 53.83 |  |  |
| Mercaptan Polysulfide (LP2) |  |  | 82.72 |  |
| Cocure 32 | 0.33 | 0.33 | 0.33 | 0.29 |
| TDI |  |  |  | 11.26 |
| Poly G 30-42 polyol |  |  |  | 42.67 |
| PPG 3025 polyol |  |  |  | 32.15 |
| DINP plasticizer |  |  |  | 8.02 |

What is claimed is:

1. A two-part composition which provides upon the homogeneous admixture of said two parts, a thixotropic liquid composition, said two parts defined as follows:
   Part A—A low viscosity liquid comprising a low molecular weight aromatic polyisocyanate; and
   Part B—A low viscosity liquid comprising an active aromatic diamine wherein the amine groups are primary and optionally a catalyst for curing said thixotropic liquid composition;
   said two-part composition having a long chain polymer selected from the group consisting of polyols, polyamines, polymercaptans, epoxy resins, and combinations thereof, said long chain member present in either Part A, Part B or divided between Parts A and B, provided that if the long chain polymer member is polyamine, said polyamine shall be in Part B;
   said isocyanate groups of said Part A being essentially stoichiometrically equivalent to the sum of the groups of said active aromatic diamine and said long chain polymer with which said isocyanate groups are reactive;
   said Part A having sufficient unreacted isocyanate groups to react with the active aromatic diamine of Part B to provide upon admixture of Parts A and B a thixotropic liquid composition and to contribute as required to curing of said composition after application thereof for its intended use; and
   said composition curing at room temperature to form the desired tough cured composition.

2. A composition of claim 1 wherein said low molecular weight aromatic polyisocyanate comprises a member of the group consisting of 4,4'-diisocyanatodiphenylmethane, polyisocyanates based on 4,4'-diisocyanatodiphenylmethane, and combinations thereof.

3. A composition of claim 2 wherein said long chain polymer is polypropylene glycol.

4. A composition of claim 3 wherein said active aromatic diamine is diethyltoluenediamine.

5. A composition of claim 1 wherein a portion of said aromatic polyisocyanate ingredient is toluene diisocyanate.

6. A composition of claim 1 wherein a portion of the aromatic polyisocyanate is prereacted with a portion of the long chain polymer to form a prepolymer before the Ingredients are mixed to provide the thixotropic liquid composition.

7. A composition which provides, upon the homogeneous admixture of the Ingredients in low viscosity liquid form, a thixotropic liquid polymer composition, said Ingredients comprising:
   I—a low molecular weight polyisocyanate;
   II—a long chain polymer selected from the group consisting of polyols, polyamines, polymercaptans, epoxy resins and combinations thereof;
   III—active aromatic diamine wherein the amine groups thereof are primary; and
   IV—optionally a catalyst for curing;
   said Ingredients II and III being present in an amount sufficient to react with substantially all of the isocyanate groups of Ingredient I to form said polymer composition;
   said Ingredient I being maintained separately from Ingredients III and IV prior to mixing of the Ingredients to prepare said composition for use;
   said composition thickening upon mixing the Ingredients to provide a thixotropic liquid whereby said composition when applied to a surface adheres thereto in an essentially non-sag manner; and said composition curing at room temperature to form the desired tough cured composition.

8. A composition of claim 7 wherein Ingredient I comprises a member of the group consisting of 4,4'-diisocyanatodiphenylmethane, polyisocyanates based on 4,4'-diisocyanatodiphenylmethane and combinations thereof as said low molecular weight polyisocyanate.

9. A composition of claim 8 wherein Ingredient II is polypropylene glycol.

10. A composition of claim 9 wherein Ingredient III is diethyltoluenediamine.

11. A composition of claim 7 wherein a portion of said Ingredient I is toluene diisocyanate.

12. A composition of claim 7 wherein a portion of Ingredient I is prereacted with a portion of Ingredient II to form a prepolymer before the Ingredients are mixed to provide the thixotropic liquid composition.

13. A composition of claim 7 wherein Ingredient I comprises 4,4'-diisocyanatodiphenylmethane, polyisocyanates based on 4,4'-diisocyanatodiphenylmethane and toluene diisocyanate; Ingredient II comprises a combination of difunctional and trifunctional polypropylene glycol; Ingredient III comprises diethyltoluenediamine; a portion of Ingredient I is prereacted with a portion of Ingredient II to form a prepolymer; and a curing catalyst defined as Ingredient IV is present.

14. A composition of claim 1 wherein low molecular weight polyisocyanate comprises toluene diisocyanate and a member of the group consisting of 4,4'-diisocyanatodiphenylmethane, polyisocyanates based on 4,4'-diisocyanatodiphenylmethane and combinations thereof; the long chain polymer comprises a combination of difunctional and trifunctional polypropylene glycol; the active aromatic diamine comprises diethyltoluenediamine; a portion of the low molecular weight polyisocyanate is prereacted with a portion of the long chain polymer to form a prepolymer; and a curing catalyst defined as Ingredient IV is present.

15. A process for making a liquid thixotropic polymer composition for the purpose of providing a coating, a sealant, an adhesive bond or a mold for reproducing the contours of the surface, said process comprising the following steps:

Step 1—making a composition which provides, upon the homogeneous admixture of the Ingredients in low viscosity liquid form, a thixotropic liquid polymer composition, said Ingredients comprising:
I—a low molecular weight polyisocyanate;
II—a long chain polymer selected from the group consisting of polyols, polyamines, polymercaptans, epoxy resins and combinations thereof;
III—active aromatic diamine wherein the amine groups thereof are primary; and
IV—optionally a catalyst for curing;
said Ingredients II and III being present in an amount sufficient to react with substantially all of the isocyanate groups of Ingredient I to form said polymer composition;
said Ingredient I being maintained separately from Ingredients III and IV prior to mixing of the ingredients to prepare said composition for use;
said Ingredient I having sufficient unreacted isocyanate groups to react with the active aromatic diamine to provide upon admixture of the Ingredients a thixotropic liquid composition and to contribute as required to curing of said composition after application thereof for its intended use; and Step 2—homogeneously mixing said Ingredients thereby providing a liquid thixotropic polymer composition without addition of fillers or other thickening agents which thixotropic polymer composition being suitable to apply a non-sag coating to a surface and which upon curing provides the desired tough composition.

16. A process of claim 15 wherein said low molecular weight aromatic polyisocyanate comprises a member of the group consisting of 4,4'-diisocyanatodiphenylmethane, polyisocyanates based on 4,4'-diisocyanatophenylmethane and combinations thereof; said long chain polymer comprises polypropylene glycol; and a portion of the aromatic polyisocyanate is prereacted with a portion of said long chain polymer are prereacted to form a prepolymer before the Ingredients are mixed to provide the thixotropic liquid composition.

17. A process of claim 15 wherein low molecular-weight polyisocyanate comprises toluene diisocyanate and a member of the group consisting of 4,4'-diisocyanatodiphenylmethane, polyisocyanates based on 4,4'-diisocyanatodiphenylmethane and combinations thereof; the long chain polymer comprises a combination of difunctional and trifunctional polypropylene glycol; the active aromatic diamine comprises diethyltoluenediamine; the low molecular weight polyisocyanate and a portion of the long chain polymer are prereacted to form a prepolymer; and a curing catalyst defined as Ingredient IV is present.

18. A process for applying a liquid thixotropic polymer to a surface for the purpose of providing a coating to the surface, a sealant, an adhesive bond or a mold for reproducing the contours of the surface, said process comprising the following steps:

Step 1—forming a two-part composition which provides upon the homogeneous admixture of said two parts, a thixotropic liquid composition, said two parts defined as follows:
Part A—A liquid comprising a low molecular weight aromatic polyisocyanate; and
Part B—A liquid comprising an active aromatic diamine wherein the amine groups are primary and optionally a catalyst for curing said thixotropic liquid composition;
said two-part composition having a long chain polymer member selected from the group consisting of polyols, polyamines, polymercaptans, epoxy resins, and combinations thereof, said long chain member present in either Part A, Part B or divided between Parts A and B, provided that if the long chain polymer member is polyamine, said polyamine shall be in Part B;
said isocyanate groups of said Part A being essentially stoichiometrically equivalent to the sum of the groups of Part B and said long chain polymer with which said isocyanate groups are reactive;
said composition thickening upon mixing the Ingredients to provide a thixotropic liquid whereby said composition when applied to a surface adheres thereto in an essentially non-sag manner; and
said composition curing at room temperature to form the desired tough composition;
Step 2—applying said thixotropic surface liquid composition to said surface; and
Step 3—permitting the applied composition to cure.

19. A process of claim 18 wherein said low molecular weight aromatic polyisocyanate comprises a member of the group consisting of 4,4'-diisocyanatodiphenylmethane, polyisocyanates based on 4,4'-diisocyanatodiphenyl methane or combinations thereof; said long chain polymer comprises polypropylene glycol; and a portion of the aromatic polyisocyanate prereacted with a portion of said long chain polymer to form a prepolymer before the Ingredients are mixed to provide the thixotropic liquid composition.

20. A process of claim 18 wherein low molecular weight polyisocyanate comprises toluene diisocyanate and a member of the group consisting of 4,4'-diisocyanatodiphenylmethane, polyisocyanates based on 4,4'-diisocyanatodiphenylmethane, or combinations thereof; the long chain polymer comprises a combination of difunctional and trifunctional polypropylene glycol; the active aromatic diamine comprises diethyltoluenediamine; the low molecular weight polyisocyanate is prereacted with a portion of the long chain polymer to form a prepolymer; and a curing catalyst defined as Ingredient IV is present.

* * * * *